(12) United States Patent
Chidambaram et al.

(10) Patent No.: US 7,458,028 B2
(45) Date of Patent: Nov. 25, 2008

(54) GRAPHICAL INTERFACE FOR CONFIGURING A POWER SUPPLY CONTROLLER

(76) Inventors: Avinash Chidambaram, 106 Gladeview Private, Ottawa, Ontario (CA) K1T 4C5; Richard Francis Penn, P.O. Box 72160, Kanata, Ontario (CA) K2K 2P4; David Cooper, 1145 Wolfgrove Road, Almonte, Ontario (CA) K0A 1A0

( * ) Notice: Subject to any disclaimer, the term of this patent is extended or adjusted under 35 U.S.C. 154(b) by 696 days.

(21) Appl. No.: 10/621,414

(22) Filed: Jul. 18, 2003

(65) Prior Publication Data
US 2005/0012396 A1    Jan. 20, 2005

(51) Int. Cl.
*G06F 15/177* (2006.01)
*G06F 15/18* (2006.01)

(52) U.S. Cl. ............... 715/736; 715/735; 307/41; 700/296

(58) Field of Classification Search ............ 307/77, 307/81; 323/282, 285; 700/291
See application file for complete search history.

(56) References Cited

U.S. PATENT DOCUMENTS

| | | | | |
|---|---|---|---|---|
| 4,924,404 A | * | 5/1990 | Reinke, Jr. ............... | 705/412 |
| 5,153,837 A | * | 10/1992 | Shaffer et al. ............ | 705/412 |
| 5,331,579 A | * | 7/1994 | Maguire et al. ........... | 703/2 |
| 5,537,339 A | * | 7/1996 | Naganuma et al. ........ | 700/276 |
| 5,604,892 A | * | 2/1997 | Nuttall et al. ............. | 703/18 |
| 5,740,031 A | * | 4/1998 | Gagnon .................... | 700/16 |
| 5,768,119 A | * | 6/1998 | Havekost et al. .......... | 700/4 |
| 5,828,851 A | * | 10/1998 | Nixon et al. .............. | 710/105 |
| 6,105,139 A | * | 8/2000 | Dey et al. ................. | 713/300 |
| 6,110,213 A | * | 8/2000 | Vinciarelli et al. ......... | 703/1 |
| 6,327,541 B1 | * | 12/2001 | Pitchford et al. .......... | 702/62 |
| 6,418,492 B1 | * | 7/2002 | Papa et al. ................ | 710/302 |
| 6,516,326 B1 | * | 2/2003 | Goodrich et al. .......... | 707/104.1 |
| 6,885,915 B2 | * | 4/2005 | Rehtanz et al. ............ | 700/291 |
| 6,922,661 B2 | * | 7/2005 | Carrillo .................... | 703/2 |
| 6,987,331 B2 | * | 1/2006 | Koeppe et al. ............ | 307/66 |
| 6,993,456 B2 | * | 1/2006 | Brooks et al. ............. | 702/183 |
| 7,024,649 B2 | * | 4/2006 | Collmeyer et al. ......... | 716/11 |
| 7,062,359 B2 | * | 6/2006 | Bjorklund ................. | 700/286 |
| 7,111,018 B1 | * | 9/2006 | Goodrich et al. .......... | 707/104.1 |
| 7,135,789 B2 | * | 11/2006 | Boros et al. .............. | 307/43 |
| 7,162,405 B2 | * | 1/2007 | Mc Cabe et al. .......... | 703/17 |
| 7,190,149 B2 | * | 3/2007 | Huff et al. ................ | 322/20 |
| 7,222,111 B1 | * | 5/2007 | Budike, Jr. ............... | 705/412 |
| 2002/0029097 A1 | * | 3/2002 | Pionzio et al. ............ | 700/286 |
| 2002/0057018 A1 | * | 5/2002 | Branscomb et al. ........ | 307/42 |
| 2002/0107615 A1 | * | 8/2002 | Bjorklund ................. | 700/286 |
| 2002/0161558 A1 | * | 10/2002 | Georges et al. ........... | 702/189 |

(Continued)

OTHER PUBLICATIONS

Siemens Inc. et al. "Power System Simulator for Operations" Jun. 2002.*

*Primary Examiner*—Weilun Lo
*Assistant Examiner*—Steven B Theriault

(57) ABSTRACT

Information for configuring control apparatus for a power system including a plurality of controlled power supplies is produced using a graphical interface which displays the topology and sequencing of the power supplies in the power system. A database is used to select power supplies to add in determining the power system topology. Sequencing is represented by displacing icons representing the power supplies along lines representing their input and output voltages, and arrows representing startup sequence dependencies. A processor produces the configuration information, consistent with the displayed topology and sequencing, using information for the selected power supplies from the database, for downloading to the control apparatus.

25 Claims, 11 Drawing Sheets

U.S. PATENT DOCUMENTS

| | | | |
|---|---|---|---|
| 2003/0167105 A1* | 9/2003 | Colborn | 700/295 |
| 2003/0167265 A1* | 9/2003 | Corynen | 707/4 |
| 2004/0015309 A1* | 1/2004 | Swisher et al. | 702/79 |
| 2004/0054508 A1* | 3/2004 | Mc Cabe et al. | 703/1 |
| 2004/0098422 A1* | 5/2004 | Levesque et al. | 707/203 |
| 2005/0010872 A1* | 1/2005 | Lee et al. | 715/744 |
| 2005/0286179 A1* | 12/2005 | Huff et al. | 361/20 |
| 2006/0005055 A1* | 1/2006 | Potega | 713/300 |
| 2006/0100912 A1* | 5/2006 | Kumar et al. | 705/4 |
| 2006/0125422 A1* | 6/2006 | Costa | 315/294 |
| 2006/0165040 A1* | 7/2006 | Rathod et al. | 370/335 |

* cited by examiner

FIG. 3

| File Information | Topology | Sequence | Parameters | GPIO | Advanced | Evaluation Board | Margining | Monitoring |
|---|---|---|---|---|---|---|---|---|

Power converters to add to Input —37

Find converters by
Voltage   Current   Make 34

|   | Model | Voltage | Current | Type | Package |
|---|---|---|---|---|---|
| 0 | XXX1 | 1.8 | 40 | Brick | n/a |
| 1 | XXX2 | 5.0 | 25 | Brick | n/a |
| 2 | XXX3 | 3.3 | 35 | Brick | n/a |
| 3 | YY1 | 1.5 | 10 | VRM | SMT |
| 4 | YY2 | 2.5 | 10 | VRM | SMT |
| 5 | Z1 | 2.0 | 0.1 | LDO | SOIC |

33

35 — New custom
31
36 — Add to rail

30

Input
48V

Details of Rail
Label
Nominal Output   Volts   Amps

Margining
Minimum
Maximum   Volts   Volts

☐ Trim on primary side

Monitoring
32

Details of Converter
Make
Model
Location   Main Board

Move   Delete

FIG. 4

| | Model | Voltage | Current | Type | Package |
|---|---|---|---|---|---|
| 0 | XXX1 | 1.8 | 40 | Brick | n/a |
| 1 | XXX2 | 5.0 | 25 | Brick | n/a |
| 2 | XXX3 | 3.3 | 35 | Brick | n/a |
| 3 | YY1 | 1.5 | 10 | VRM | SMT |
| 4 | YY2 | 2.5 | 10 | VRM | SMT |
| 5 | Z1 | 2.0 | 0.1 | LDO | SOIC |

File Information | Topology | Sequence | Parameters | GPIO | Advanced | Evaluation Board | Margining | Monitoring Power converters to add to Rail V0 — 37

Find converters by
Voltage  Current  Make — 34

33

35 → New custom
31
36 → Add to rail

Input
48V  PC0  Brick  Rail V0  1.8V 40A

30

Details of Converter PC0
Make: Maker1
Model: XXX1
Location: Main Board
Move  Delete Details of Rail V0
Label: V0
Nominal Output: 1.8 Volts / 40 Amps Margining
Minimum: 1.75 Volts
Maximum: 1.85 Volts
☐ Trim on primary side Monitoring
32

GRAPHICAL INTERFACE FOR CONFIGURING A POWER SUPPLY CONTROLLER

This invention relates to a graphical interface for use in configuring a power supply controller, in particular a power supply controller that can be used for controlling a plurality of power supplies. The term "power supply" is used herein to refer to any type of device for supplying controlled electrical power for a load. For example, the power supplies may comprise isolating and/or non-isolating switch mode power supplies or DC power converters, voltage regulator modules, and linear voltage regulators.

REFERENCE TO RELATED APPLICATIONS

Reference is directed to the following copending United States patent applications, the entire disclosure of each of which is hereby incorporated herein by reference:

"Power Supply Controller", R. Orr et al., application Ser. No. 10/428,095 filed May 2, 2003;

"Sequencing Power Supplies", D. Brown et al., application Ser. No. 10/428,105 filed May 2, 2003;

"Sequencing Power Supplies On Daughter Boards", D. Brown et al., application Ser. No. 10/428,136 filed May 2, 2003.

BACKGROUND

The related applications describe and claim aspects of a power supply controller which can be used for controlling a plurality of isolating and/or non-isolating power supplies, such as switch mode power supplies or DC power converters, and linear voltage regulators, for providing controlled electrical power to loads. For example, the power supplies may provide different supply voltages to various electrical circuits on a circuit card on which the power supply controller is also provided. As described in the related applications, the power supply controller has six converter state machines (CSMs), one for each of up to six controlled power supplies, and an input state machine (ISM) for an input or supply voltage for the controlled power supplies.

A primary aspect of the control of the power supplies relates to their sequencing in accordance with conditions monitored by the power supply controller. Sequencing refers to an order in which, and parameters in dependence upon which, the power supplies are enabled or started up in a power-up process, disabled or shut down in a normal power-down process, and/or disabled or shut-down in a fault situation. The monitored conditions include, for example, the input voltage and the output voltages produced by the respective power supplies. For example, enabling of each individual controlled power supply on power-up of the circuit card can be dependent upon the input voltage, or upon a monitored output voltage of a prior-enabled power supply, exceeding a threshold voltage.

The related applications by D. Brown et al. disclose arrangements of controlled power supplies that can provide relatively arbitrary sequence topologies, and that allow for a location of each controlled power supply on either a main circuit board or a daughter board. As described in these applications, various configuration registers are provided in the power supply controller to identify the presence and locations of the controlled power supplies and their sequencing for power-up, normal shut-down, and shut-down in a fault situation.

In addition to this information, it is desirable to be able to vary, and it is therefore necessary to specify for desired operation of the power supply controller, a large amount of other configuration information relating to the controlled power supplies and their sequencing.

By way of example, such other information can include, for each controlled power supply, under- and over-voltage thresholds and associated time periods for triggering warnings and detecting fault conditions in operation of the controlled power supply, a mask time period for start-up to be completed before under-voltage monitoring takes effect, a start-up voltage threshold which must be exceeded to trigger a subsequent CSM in the power-up sequence of the controlled power supplies, a restart voltage threshold below which the monitored voltage must fall before a power-up sequence is initiated following a shut-down of the controlled power supplies, voltage parameters for adjustment or trimming of the controlled power supply output voltages, and time delay periods associated with the power-up, normal shut-down, and fault shut-down sequences.

Such other information can further include a threshold voltage and related period which must be exceeded by the input voltage for a power-up sequence of the controlled power supplies to begin, and information related to the use of general purpose input/output (GPIO) pins of the power supply controller.

All of this and any other desired information for operation of the power supply controller, collectively referred to herein as configuration information, must be correctly set up for operation of the power supply controller. For example, the configuration information is stored in a non-volatile random access memory (NVRAM) of the power supply controller, and is downloaded from the NVRAM to registers of the power supply controller on power-up of the power supply controller.

While such a power supply controller is very versatile, it can be seen that its configuration information is relatively complex. Voltage thresholds and time delays such as those identified above, especially those relating to power supply sequencing for power-up and shut-down, must be correctly set for operation of the power system; if even one of the registers for this configuration information is set incorrectly the power system may be rendered inoperable. Furthermore, the configuration of the power supply controller may be by power system designers who have previously used only analog power system control circuits and who are not familiar with a configurable power supply controller such as described above.

Accordingly, there is a need to facilitate such configuration of a power supply controller.

SUMMARY OF THE INVENTION

According to one aspect of this invention there is provided a graphical interface method for producing configuration information for control apparatus for a power system including a plurality of power supplies, comprising the steps of, using a processor: receiving information relating to characteristics and connections of the plurality of power supplies, said information determining a topology of the power system; displaying on a display device a graphical display representing the topology of the power system; receiving user input information to determine sequencing of the plurality of power supplies; displaying on the display device a graphical display representing the sequencing of the plurality of power supplies; and producing said configuration information for the control apparatus consistent with the displayed topology and sequencing of the plurality of power supplies.

The step of receiving said information determining a topology of the power system preferably comprises receiving user input information for identifying information for at least one of the plurality of power supplies in a database. In this case the step of producing said configuration information conveniently comprises deriving information for said at least one of the plurality of power supplies from the database.

Preferably the step of displaying a graphical display representing the topology of the power system comprises displaying icons representing the plurality of power supplies and paths extending to and from the icons representing input and output voltage lines of the power supplies.

The step of displaying a graphical display representing the sequencing of the plurality of power supplies can comprise displaying at least some of said icons representing the plurality of power supplies in relatively different positions along respective ones of said paths, and/or displaying at least one additional symbol, such as an arrow and/or a sequence number, representing said sequencing.

The step of receiving user input information to determine sequencing of the plurality of power supplies preferably comprises the steps of displaying options for possible sequencing of each of the plurality of power supplies after another of the plurality of power supplies, and determining sequencing in response to user input selection of said options. Conveniently, a matrix is displayed having different representations for selected, selectable, and non-selectable sequencing options.

Preferably the graphical display representing the sequencing of the plurality of power supplies represents startup sequencing of the power supplies, and the step of producing said configuration information for the control apparatus comprises producing said configuration information for startup sequencing of the power supplies consistent with the displayed sequencing and for normal shutdown of the power supplies with sequencing reversed from the startup sequencing.

Desirably, different types of power supply, e.g. isolating or non-isolating, switch mode and linear, power supply types, are represented by different icons.

The invention also provides a method of configuring control apparatus for a power system including a plurality of power supplies, comprising the steps of producing configuration information for the control apparatus using the method recited above, and transferring the configuration information to the control apparatus.

Another aspect of the invention provides a graphical interface method for producing configuration information for control apparatus for a power system including a plurality of power supplies, comprising the steps of, using a processor: in response to user input, displaying on a display device a graphical display representing the topology and sequencing of the plurality of power supplies of the power system; and producing said configuration information for the control apparatus consistent with the displayed topology and sequencing of the plurality of power supplies.

A further aspect of the invention provides a graphical interface method for producing configuration information for control apparatus for a power system including a plurality of power supplies, comprising the steps of, using a processor: in response to user input, selecting power supplies using a database; in response to user input, determining sequencing of the power supplies; displaying on a display device a graphical display representing the power supplies and their sequencing; and producing said configuration information for the control apparatus consistent with the displayed sequencing of the power supplies and using information from the database for the selected power supplies.

The invention also provides a computer readable storage medium having software stored thereon for instructing a processor to implement any of the methods recited above.

BRIEF DESCRIPTION OF THE DRAWINGS

The invention will be further understood from the following description by way of example with reference to the accompanying drawings, in which:

FIGS. 3 to 6 illustrate a graphical interface for configuring a power supply controller in accordance with an embodiment of this invention, these figures showing stages in defining a topology of a power supply system;

DETAILED DESCRIPTION

Figure 1:
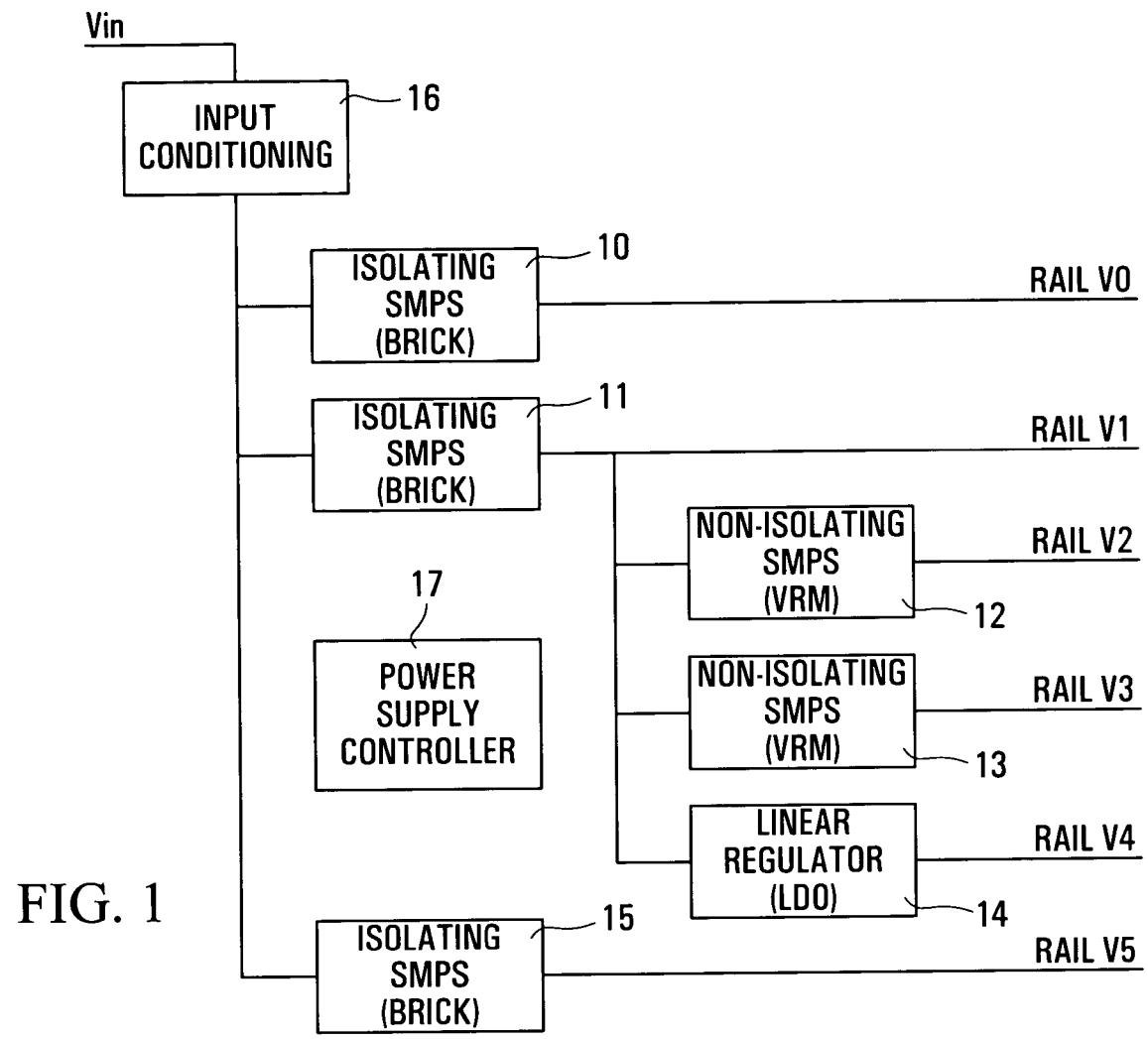
FIG. 1 shows a block diagram of one example of a power supply system including a power supply controller and a plurality of controlled power supplies.

Referring to FIG. 1, a power system is illustrated by way of example as including six power supplies or converters 10 to 15, an input voltage conditioning unit 16, and a power supply controller 17, all of which for example may be provided on a circuit card which, when inserted in an electrical equipment slot, is connected to an input power supply voltage Vin of for example 48 volts which serves as a power source for the entire card. The controller 17 then controls the power supplies 10 to 15 for producing respective supply voltages on rails V0 to V5 for electrical circuits on the circuit card. This control includes monitoring of the input voltage Vin and the output voltages of the controlled power supplies 10 to 15, and sequencing of the power supplies on power-up, normal shut-down, and fault shut-down, for example as described in the related patent applications referred to above.

A power system can have any number of controlled power supplies or converters, and these can have a variety of different forms and can be connected to receive their respective source voltages in accordance with any desired topology. In the example of FIG. 1, each of the power supplies or converters 10, 11, and 15 is an isolating switch mode power supply (SMPS), also referred to as a DC or DC-to-DC converter or a brick, whose source voltage is the input voltage Vin conditioned by the unit 16. Further, each of the other power supplies or converters 12 to 15 is a non-isolating power supply whose source voltage is constituted by the output of the power supply or converter 11 on the rail V1. Each of the power supplies 12 and 13 is a non-isolating switch mode power supply or converter also referred to as a voltage regulator module (VRM). The power supply 14 is a non-isolating linear voltage regulator, which typically has a low drop out voltage and accordingly is also referred to as an LDO.

For convenience, this power system arrangement and topology as described above and illustrated in FIG. 1 is adopted throughout this description, but it can be appreciated that the power system can have any desired arrangement and topology, including any desired numbers of input voltages, power supplies, and output voltages.

Although the power system topology may impose constraints on the sequencing of the controlled power supplies (for example in the power system topology of FIG. 1 it is apparent that the power supplies 12 to 14 can not be powered up before power-up of the power supply 11 from which they derive their input voltages), the sequencing of the controlled power supplies is otherwise independent of the power system topology. Thus, for example, in the power system of FIG. 1 the power supplies or converters 10, 11, and 15 can be controlled by the controller 17 to be powered up simultaneously or in any desired sequence relative to one another.

Figure 2:
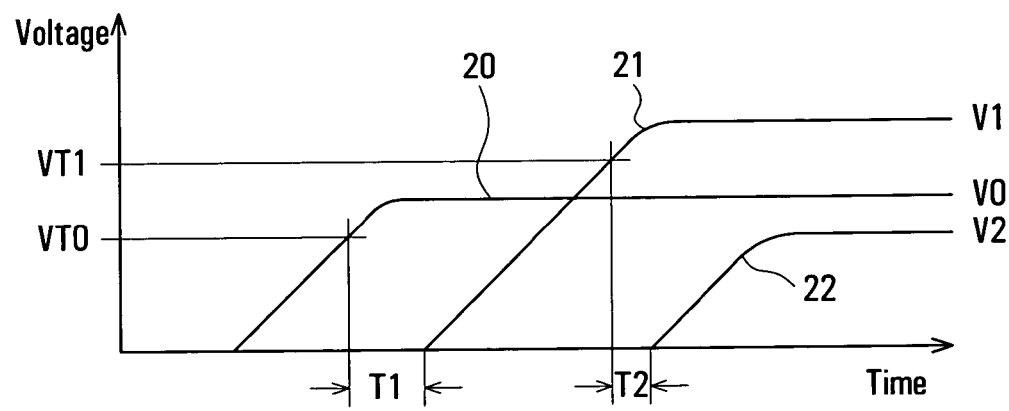
FIG. 2 illustrates an example of sequencing of controlled power supplies.

FIG. 2 is a graph of output voltage as a function of time, illustrating one example of a power-up sequence of the controlled power supplies 10, 11, and 12 of FIG. 1 to produce their respective output voltages V0, V1, and V2 under the control of the power supply controller 17. Lines 20, 21, and 22 in FIG. 2 represent the respective output voltages of the controlled power supplies during this power-up sequence.

As shown in FIG. 2, the controller 17 initially (for example on determining that the input voltage Vin has exceeded a specified threshold voltage for a specified time period) enables the power supply 10, and its output voltage rises as shown by the line 20. When this output voltage exceeds a specified voltage threshold VT0, a start-up delay timer for the power supply 11, which is specified as being next in this power-up sequence, is started to time a specified period T1, on the expiry of which the controller 17 enables this power supply 11 so that its output voltage rises as shown by the line 21. When this output voltage exceeds a specified voltage threshold VT1, a start-up delay timer for the power supply 12, which is specified as being next in this power-up sequence, is started to time a specified period T2, on the expiry of which the controller 17 enables this power supply 12 so that its output voltage rises as shown by the line 22.

The voltage thresholds VT0, VT1, periods T1, T2, and the specified sequence are examples of extensive configuration information with which, as discussed in the Background above where further examples are also given, the controller 17 must be loaded for proper control and operation of the power system. When all of this configuration information has been determined for a particular type of power system, it can be simply loaded into the NVRAM of the controller 17. However, determining all of the configuration information accurately and appropriately during a design phase of a power system can present a considerable difficulty for power system designers.

This difficulty is substantially reduced, and the design of a power system using a configurable power supply controller such as the controller 17 in FIG. 1 is considerably facilitated, by the use of a graphical interface in accordance with this invention. By way of example, a graphical interface in accordance with one particular embodiment of the invention is described below with reference to FIGS. 3 to 11 of the drawings. As indicated above, the illustrations in these figures relate to the particular power system topology described above with reference to FIG. 1, and it can be appreciated that the graphical interface is applicable to arbitrary topologies.

As will be appreciated, the graphical interface is conveniently provided on a display screen of a computer, and the computer conveniently provides not only management of the graphical interface as described below, but also features such as checking to avoid errors in the design of the power system and its operation, automatic establishment of appropriate parameters from a database of power supplies or converters which may be used in the power system, automatic setup of default values for other parameters, facilities to display and for a sophisticated designer to adjust any of the configuration information, and downloading of the resulting configuration information from memory or other storage in the computer, for example for evaluation of the configured power system using an evaluation board.

Each of FIGS. 3 to 6 represents a "Topology" display, and each of FIGS. 7 to 11 represents a "Sequence" display, of the graphical interface which are selected by respective tabs shown in these figures at the top of each display. Other tabs shown in FIGS. 3 to 11 provide other displays which are not illustrated here. By way of example, as illustrated in FIGS. 3 to 11 a "File Information" tab is provided to select a display for files relating to a particular power system; "Parameters", "GPIO", and "Advanced" tabs are provided to select displays for showing configuration parameters, setting parameters related to GPIO pins of the controller 17, and adjusting any of the configuration information; an "Evaluation Board" tab is provided to select a display and function for downloading the configuration information to an evaluation power system; and "Margining" and "Monitoring" tabs are provided to select displays for showing and adjusting information related to margining and monitoring of the output voltages of the controlled power supplies.

As shown in each of FIGS. 3 to 6, the Topology display comprises a graphical panel 30, an upper panel 31 above the panel 30, and a lower panel 32 below the panel 30, the lower panel being divided horizontally into four sections identified as "Details of Converter", "Details of Rail", "Margining", and "Monitoring". For simplicity and clarity, the Monitoring section is illustrated as being blank in each of FIGS. 3 to 6, but may include monitoring information for a power supply or converter highlighted in the panel 30 as described below. The upper panel 31 contains a database window 33, a find window 34, selection buttons 35 and 36, and a caption 37.

The computer stores in a database information relating to power supplies or converters that may be used in a power system, and information relating to a few of these is displayed in the database window 33, which may be a scrollable window in known manner. For example, FIGS. 3 to 6 illustrate the displayed information as including a model identifier, nominal output voltage, maximum load current, type (brick, VRM, or LDO as discussed above), and package information for each of six power supplies or converters in the database. Other information can similarly be displayed in the database window 33. The information stored in the database for each power supply or converter also includes parameters constituting other parts of the configuration information required by the controller 17 in conjunction with use of the particular converter in a power system. For example, these parameters include preferred or default values for the various threshold voltages and associated time periods discussed above, such as the start-up voltage threshold, under- and over-voltage thresholds, etc. discussed above. This default or preferred configuration information can optionally be displayed (by horizontal scrolling) in the database window 33, but this is not necessary because this information can instead be displayed by selecting other tabs (e.g. the Parameters tab).

The find window 34 is used in known manner to enter selection criteria, for example for output voltage, maximum output current, and/or make of converter, for finding desired converters in the database, for display of their relevant information in the database window 33. Selecting the button 35, labeled "New custom", opens a window that enables information for a power supply or converter to be entered and added to the database in known manner.

Within the graphical panel 30, supply voltage lines are represented by horizontal and vertical lines, and power supplies or converters are represented by icons to and from which horizontal supply voltage lines extend. The Topology display is used to construct a power system design with a desired arrangement and topology as described below. By way of example, the supply voltage lines are normally displayed as black lines, and a highlighted supply voltage line is displayed as a bright blue line. Similarly, different colors are desirably used in the panel 30 for the icons for different types of power supply or converter, for example a brick or red-brown color for a brick or isolating SMPS, blue for a VRM or non-isolating power supply or converter, and green for an LDO. These normal colors are conveniently lightened to highlight a selected converter. These different colors considerably enhance visible distinctions among the icons displayed in the panel 30, but are not shown in the figures. In the figures, highlighted icons and supply voltage lines are shown by bold outlines and lines.

In addition, different types of power supply or converter are represented in the panel 30 by different icon displays, as further described below.

Initially, on selecting the Topology tab for a new power system design, the Topology display appears as shown in FIG. 3, with only an input voltage line shown and highlighted at the top left of the panel 30. This line is labeled "Input" and its nominal voltage (e.g. 48V) is represented adjacent the line. This is a default voltage, which for example can be changed by selecting this voltage to display a change window. It is observed that as described here there is only one input voltage source; alternatively a power system can include two or more input voltage sources, and each additional input voltage source can be added to the Topology display in the panel 30 in any desired manner.

In FIG. 3 the caption 37 reads "Power converters to add to Input", as there is no other voltage line to which a converter can be added. No information (other than a default location of a converter on a main board) is displayed in the lower panel 32.

A power supply or converter can be added to the input voltage line in the panel 30 by selecting the converter in the database window 33 and selecting the button 36, labeled "Add to rail", to produce a Topology display for example as shown in FIG. 4, in which the added converter has been selected to highlight it and its output voltage line. As shown in FIG. 4, in the panel 30 the added converter has the adjacent label PC0 (power converter zero) and produces its output voltage on a line labeled Rail V0, the nominal output voltage and maximum load current being shown adjacent the line representing this rail. Because this converter and its output voltage rail are highlighted, related information derived from the database is also shown in the sections of the lower panel 32, and the caption 37 in the panel 31 now reads "Power converters to add to Rail V0".

The added power converter PC0, information for which is highlighted (shown by a bold outline) in the database window 33, is an isolating SMPS or brick; this is represented in the panel 30 by the icon for this converter containing the word "Brick" and illustrating a transformer to represent the isolation between its input and output (in addition to the icon color as described above).

At the bottom left of the lower panel 32, buttons labeled "Move" and "Delete" enable a power converter and its output voltage rail, highlighted in the panel 30, to be moved (where this is possible) or deleted. It can be appreciated that instead of, or in addition to, these and other functions as described here, the graphical interface may provide any other desired ways for changing the displayed power system topology. In particular, it is observed that these ways may include menu selections, keyboard operations, and/or so-called "drag-and-drop" functions using a computer mouse or other pointing and selecting device.

Figure 5:
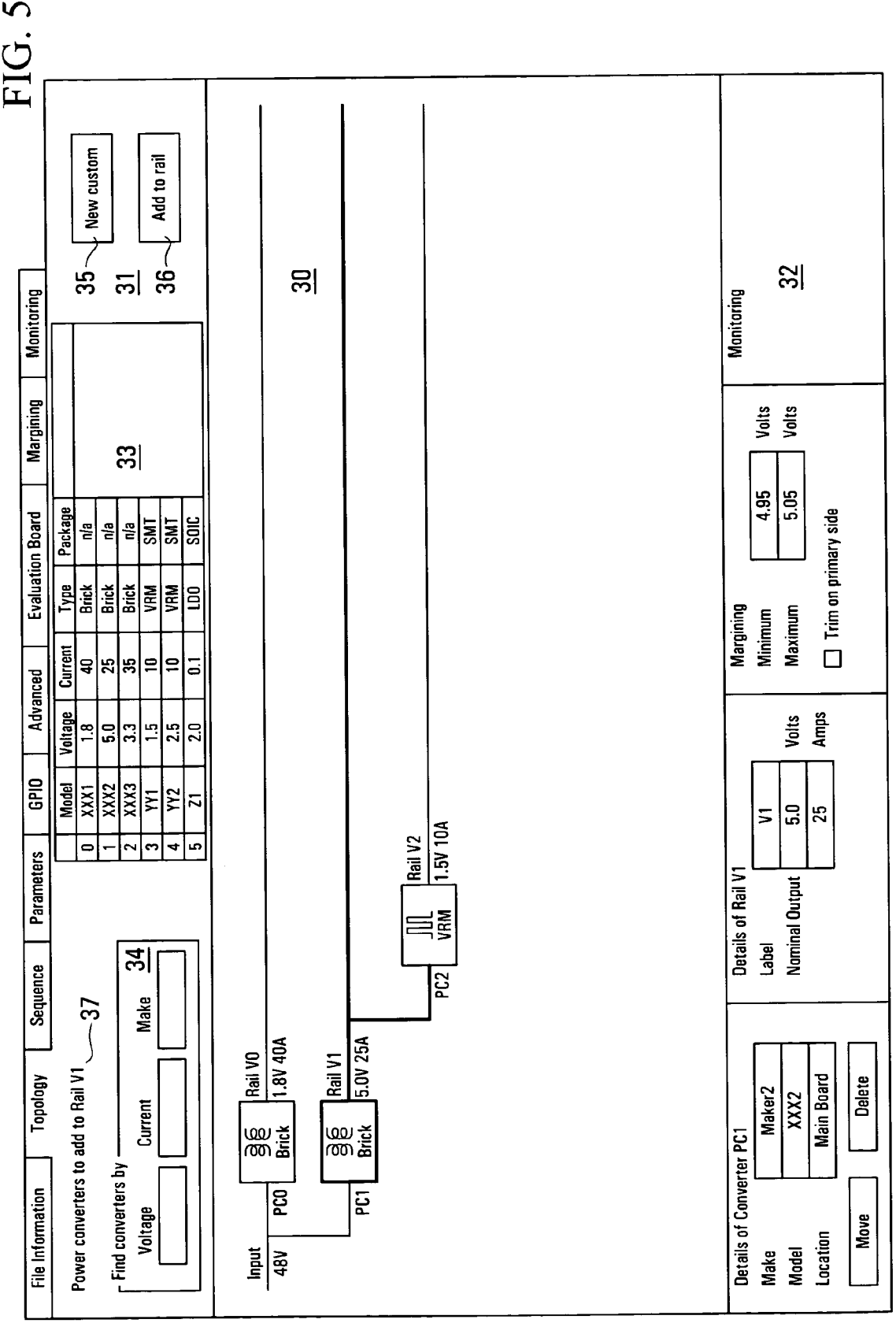

In a similar manner, other power supplies or converters can be added to the displayed power system topology. For example, FIG. 5 illustrates the Topology display after adding further converters labeled PC1 and PC2, the converter PC1 having been added by selecting the input voltage line to highlight it, selecting the desired converter in the database window 33, and selecting the button 36 to add this converter to the input voltage line, and the converter PC2 having been added by selecting the converter PC1 or its output voltage rail V1 to highlight these, selecting the desired converter in the database window 33, and selecting the button 36 to add this converter to the output voltage rail V1. Because the converter PC1 and its output rail V1 are highlighted in the panel 30 as shown in FIG. 5, the lower panel 32 displays information for this converter and rail, and the caption 37 in the upper panel reads "Power converters to add to Rail V1".

As shown in FIG. 5, the power converter PC1 is an isolating SMPS or brick which is represented in a similar manner to the power converter PC0, and the power converter PC2 is a VRM which is identified by an icon showing a rectangular waveform (representing that this is a switch mode power supply without isolation) and the label VRM, as well as by its color as described above.

Figure 6:
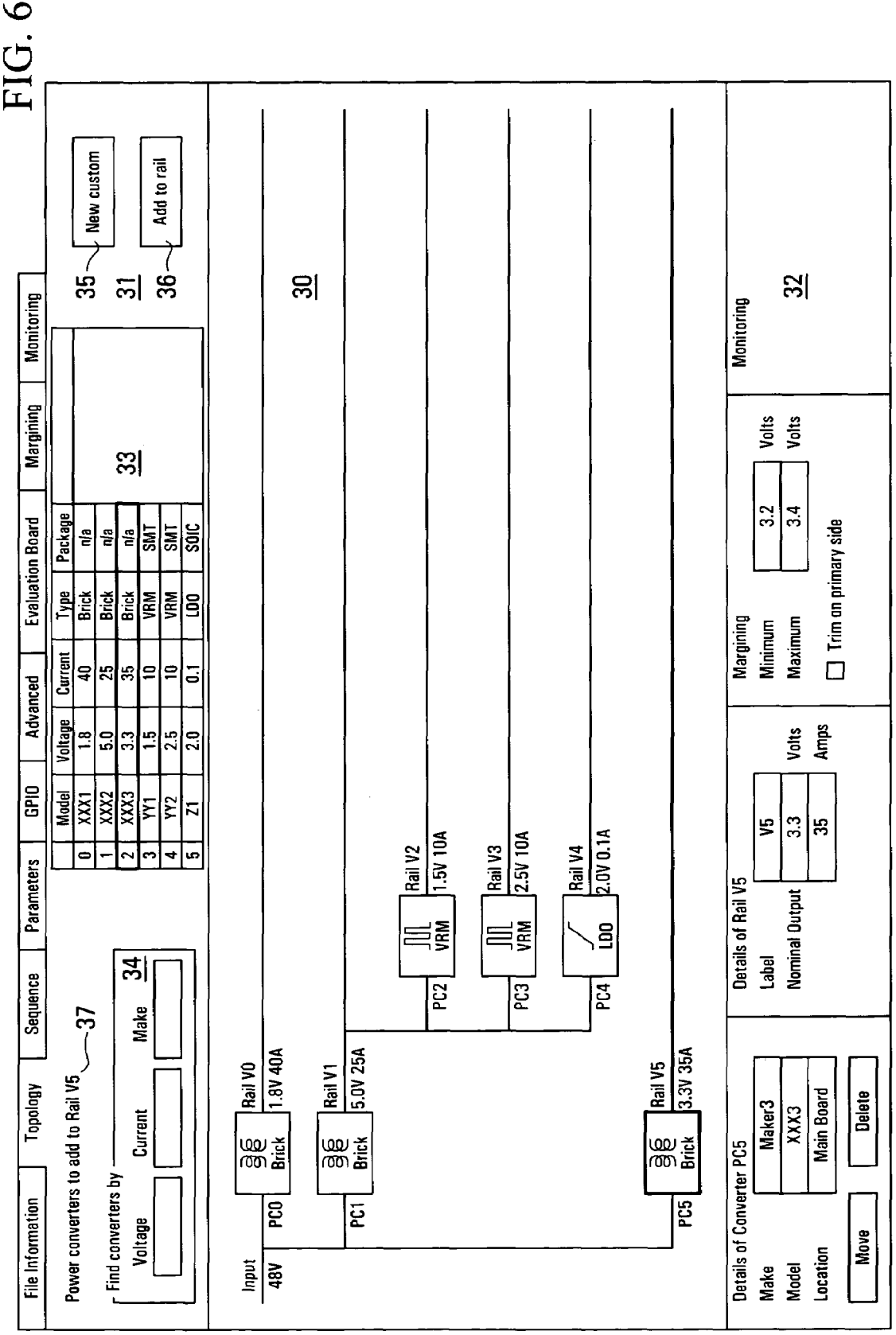

In a similar manner, further power converters PC3 and PC4 are added to the output voltage rail V1 of the converter PC1, and a further power converter PC5 is added to the input voltage rail, to produce the Topology display as shown in FIG. 6. The converter PC3 is a VRM which is represented in a similar manner to the converter PC2, and the converter PC5 is a brick which is represented in a similar manner to the converters PC0 and PC1. The converter PC4 is a liner regulator or LDO, for which the icon shows a ramp representing a linear function, and the label LDO, as well as being identified by its color as described above. In each case, the output voltage and current characteristics are displayed in the panel 30 adjacent the respective converter. It will be appreciated that the topology of the power system as shown in FIG. 6 is the same as that shown in FIG. 1.

With the addition of each power supply or converter to the power system topology as described above, the computer also derives from the database preferred or default values of the configuration information for the respective converter, so that this information can be subsequently (possibly after modification by a sophisticated designer) downloaded to configure the power supply controller 17 in a manner to ensure proper operation. At the same time, the computer operates through the graphical interface to preclude errors in the power system topology. For example, the computer can prevent any non-isolating converter from being attached to the input voltage line, and can ensure that each converter can only be added to a rail or line having a voltage suitable as an input voltage for the converter, and so on.

Figure 7:
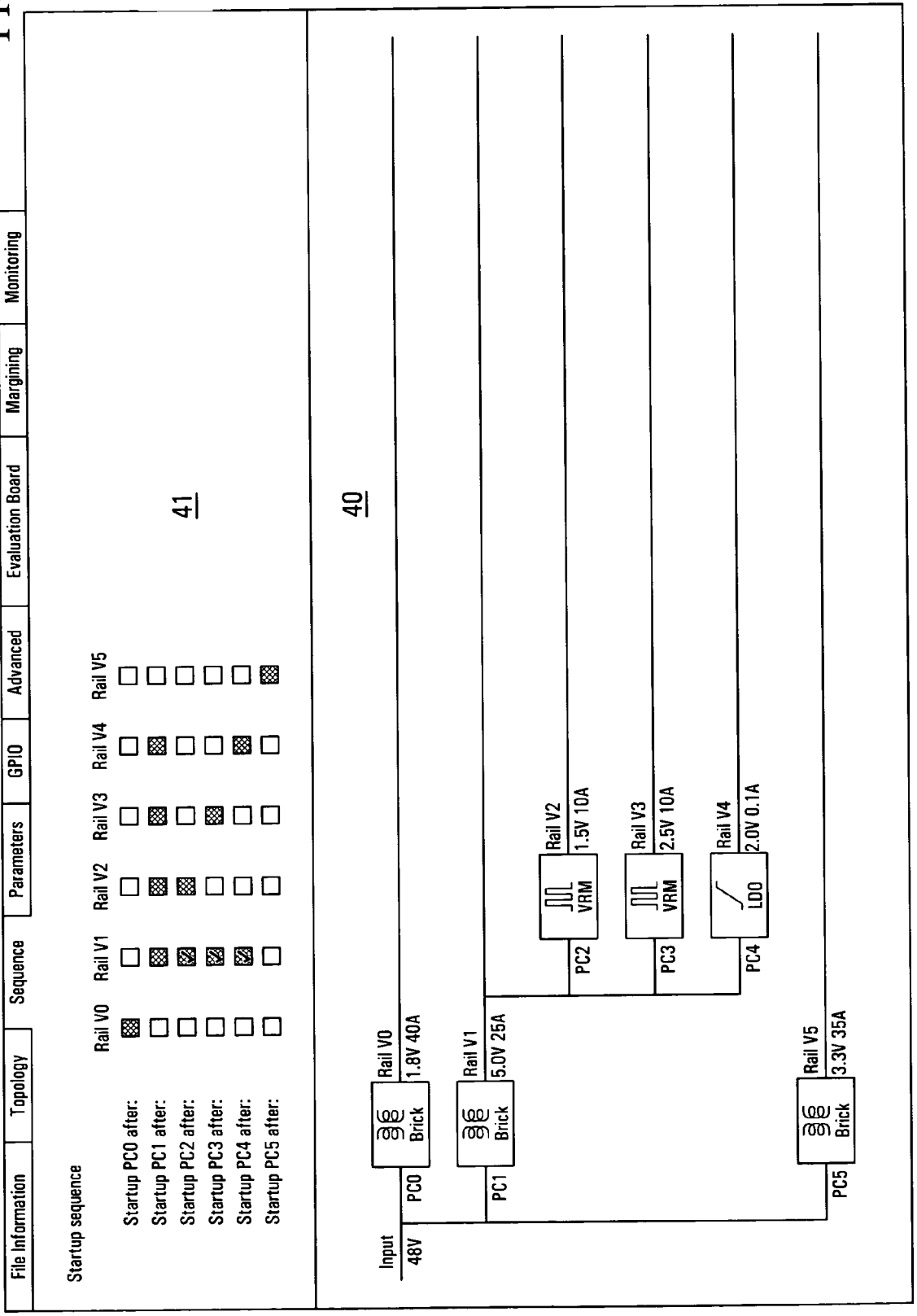
FIGS. 7 to 10 illustrate the graphical interface, showing stages in defining sequencing of the controlled power supplies of the power supply system having the topology shown in FIGS. 1 and 6.

Having determined the topology of a power system in the manner described above, a power system designer can also specify a power-up sequence for the converters of the power system, for which the Sequence tab is selected to display a Sequence display which, as shown in each of FIGS. 7 to 11, comprises a graphical panel 40 and an upper panel 41 above the panel 40. For the power system topology of FIG. 6, on initial selection of the Sequence tab the Sequence display is as shown in FIG. 7, in which the display in the graphical panel 40 is the same (except for any highlighting, which is removed) as the display in the graphical panel 30 of the Topology display as shown in FIG. 6. Thus the Sequence display graphical panel 40 also shows the power system topology.

The upper panel 41 of the Sequence display represents a startup (i.e. power-up) sequence for the power supplies or converters of the power system in the form of a square matrix or grid of selection or check boxes. Each row of the grid corresponds to a respective one of the power converters PC0 to PC5 in the power system, and each column of the grid corresponds to a respective one of the rails V0 to V5 on which the power converters produce their respective output voltages. A startup or power-up sequence is represented in the panel 41 by check-marks or ticks in respective boxes of the grid as further described below.

For example, if it were desired to power up the converter PC1 only after the converter PC0 has been enabled and is producing on its output voltage rail V0 a voltage which exceeds the threshold voltage VT0 as described above with reference to FIG. 2, then the check box in the second row, labeled "Startup PC1 after:" and the first column, labeled "Rail V0", would be selected to place a check-mark or tick in this box. Thus this grid in the panel 41 provides a verbal representation of the power-up sequence, in this case in the form "Startup [the power converter] PC1 after [the] Rail V0 [is active, i.e. has a voltage produced by the power converter PC0 that exceeds the respective threshold voltage VT0]". This verbal message is enhanced by a corresponding change in the graphical display as described later below.

Referring to FIG. 7, it can be seen that without any specific sequencing information being provided, some of the boxes of the grid are shown hatched to indicate that they can not be selected, and some of these hatched boxes also contain ticks, these indications being provided automatically by the computer. More particularly, it can be seen that all of the boxes of one diagonal of the square grid are hatched and can not be selected, because it is not possible for any of the power converters to be powered up after its own output voltage rail is active. Thus, for example, the box in the first row and first column can not be selected, because it is not possible for the rail V0 to be active without the converter PC0 already having been powered up.

Further, the hatched check boxes containing ticks are determined by the topology of the power system. As illustrated in FIGS. 6 and 7 and as described above, in this topology each of the converters PC2 to PC4 receives as its input voltage the output voltage of the converter PC1 on the rail V1. Thus the topology is such that each of these converters can only be powered up after the converter PC1 is powered up to produce this voltage on the rail V1. This is represented in FIG. 7 by the hatched and ticked check boxes of the grid, which are all in the column for the rail V1, in the rows for the converters PC2 to PC4. Accordingly, the power-up sequencing inherent in the determined power system topology is incorporated into the grid in the panel 41. This inherent sequencing is also represented in the graphical panel 40, in that the converters PC2 to PC4 are displayed horizontally to the right of the converters PC0, PC1, and PC5.

Conversely, it can be appreciated that the converter PC1 must be started before the converters PC2 to PC4 produce their output voltages on the rails V2 to V4. Accordingly, the check boxes in the row for the converter PC1 and the columns for these rails V2 to V4 are hatched and can not be selected.

Figure 8:
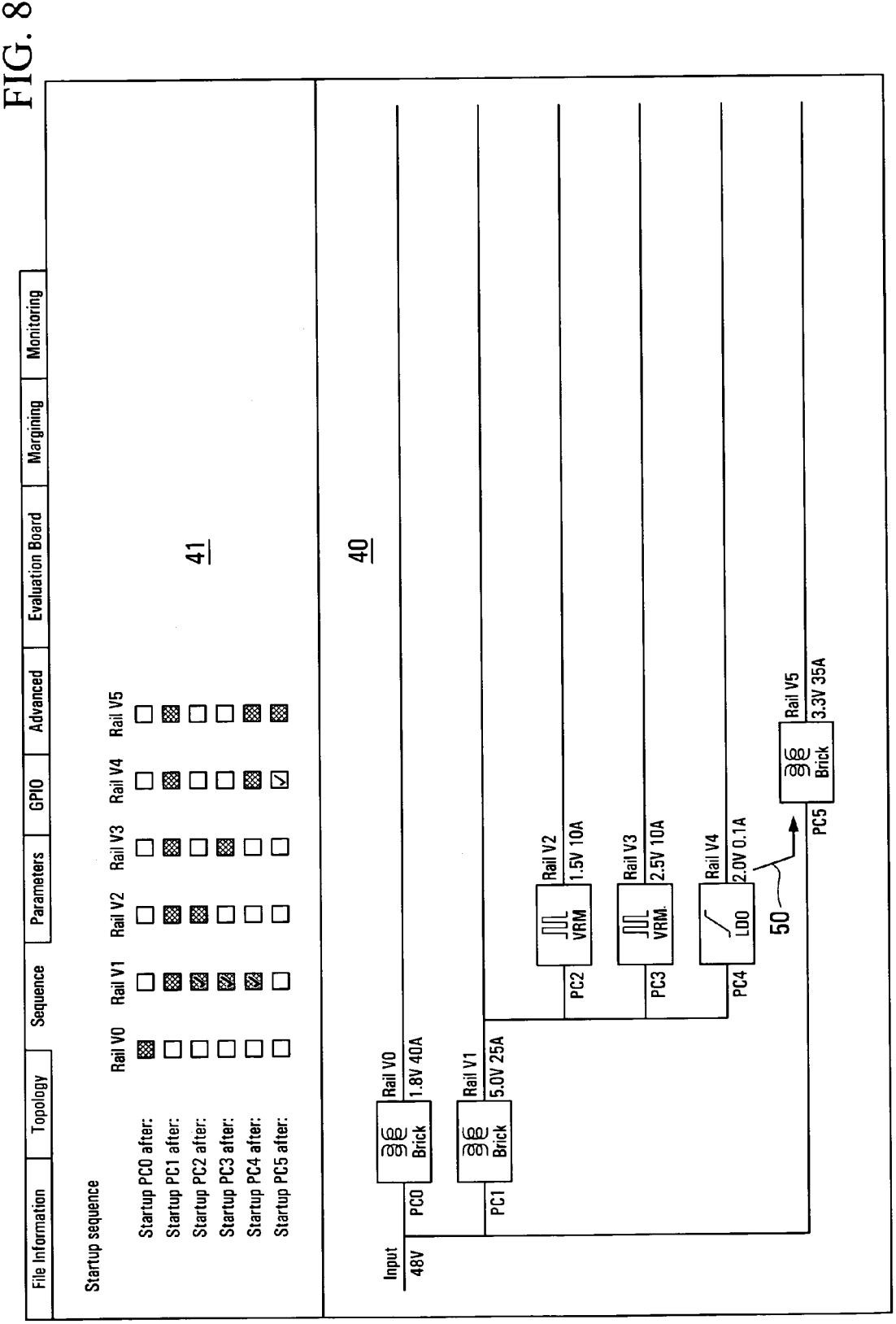

FIG. 8 represents additional sequencing information to start up the converter PC5 after the rail V4 is active. To this end, a designer selects the box for the last row labeled "Startup PC5 after:" and the column labeled "Rail V4". The computer places a tick in this selected box, and conversely determines that the converter PC4 can not now be started after the rail V5 is active, so that it shows the corresponding box in the PC4 row and the V5 column as hatched and not selectable. Further, the computer determines from the power system topology that the converter PC1 can not now be started after the rail V5 is active, so that it also shows the corresponding box in the PC1 row and the V5 column as hatched and not selectable. The display in the other boxes of the grid in FIG. 8 is the same as in FIG. 7.

In addition, as shown in FIG. 8 the computer provides a graphical representation of this additional sequencing information in the graphical panel 40, by moving the icon for the converter PC5 horizontally to the right of the converter PC4 having the output voltage rail V4, and displaying an arrow 50 from the rail V4 to the icon for the converter PC5. For example, the arrow 50 has a color contrasting with the other colors of the graphical panel, so that it is prominent in the display.

Figure 9:
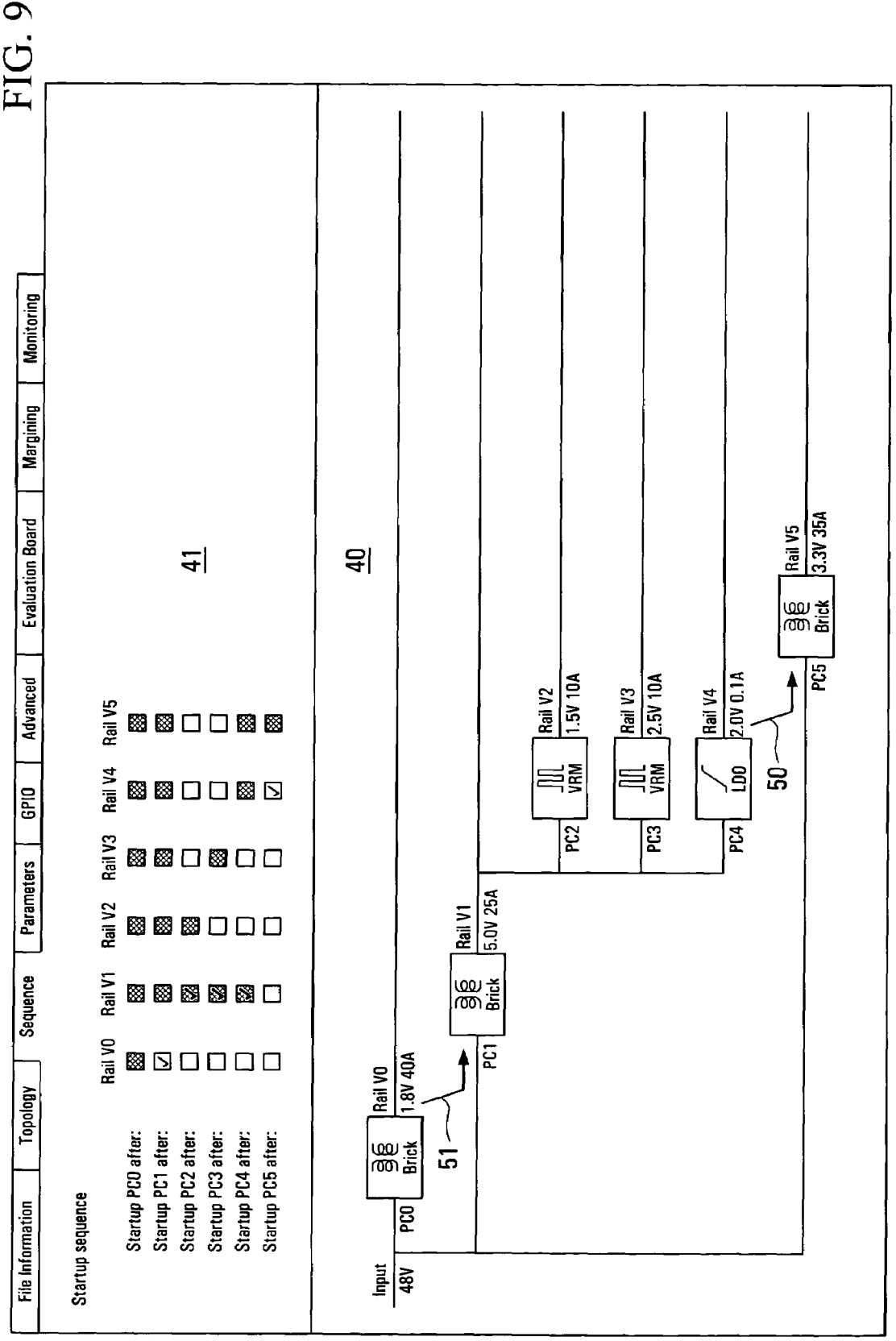

Similarly, FIG. 9 represents additional sequencing information to start up the converter PC1 after the rail V0 is active. To this end, the designer selects in the grid of the panel 41 the box in the PC1 row and the V0 column. The computer places a tick in this selected box, and conversely determines that now the converter PC0 can not now be started after any voltage rail is active, so that it shows all of the boxes in the PC0 row as hatched and not selectable. As also shown in FIG. 9, the computer represents this additional sequencing information in the graphical panel 40 by moving the icon for the converter PC1 horizontally to the right of the converter PC0 having the output voltage rail V0, and displaying an arrow 51 from the rail V0 to the icon for the converter PC1. Consequently, the computer also moves the display of the icons for the converters PC2 to PC5, the input connections of the converters PC2 to PC4, and the arrow 50 horizontally to the right to maintain the relative positions of these elements of the graphical display.

Figure 10:
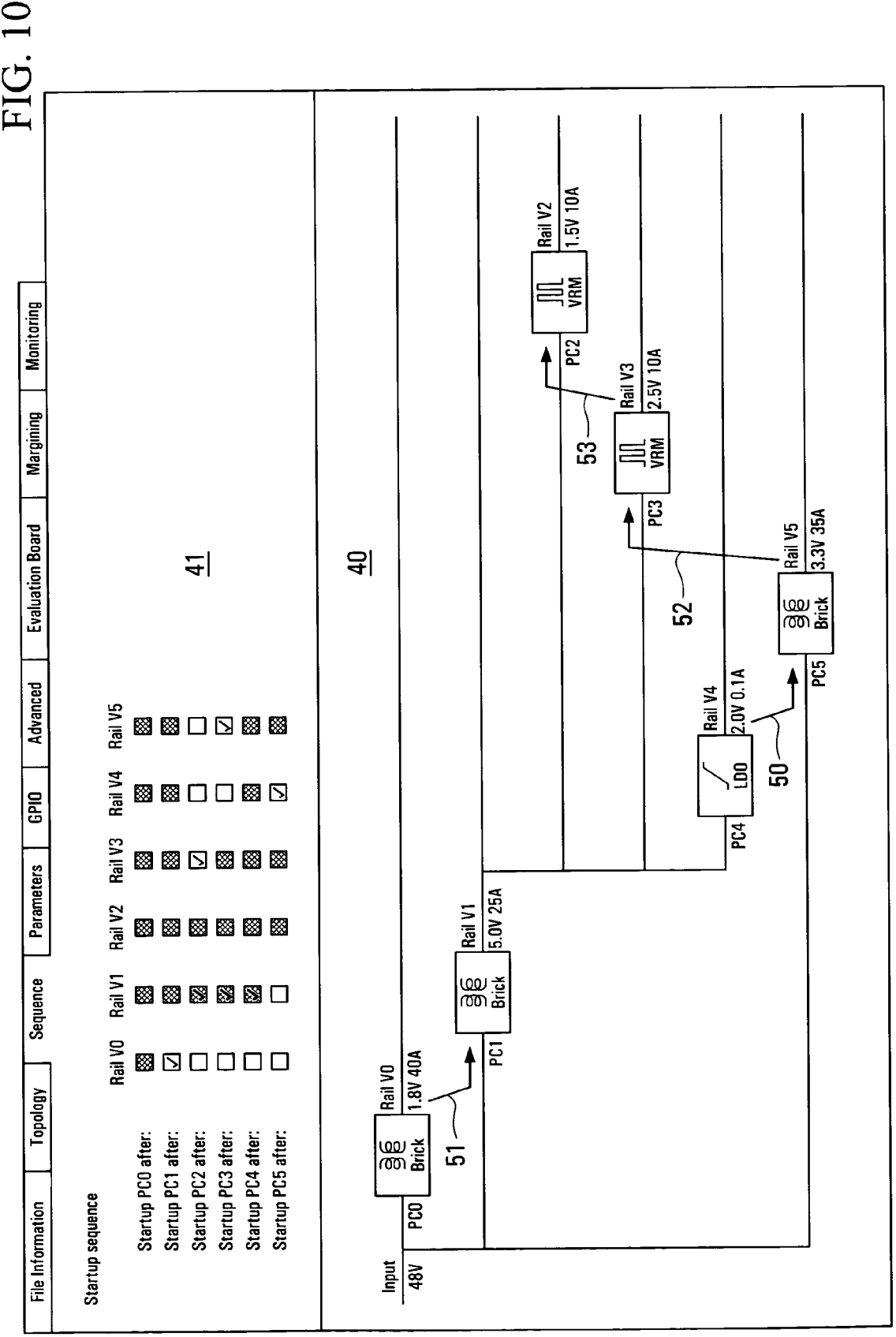

FIG. 10 similarly represents further sequencing information added to the Sequence display, to power up the converter PC3 after the rail V5 is active, and to power up the converter PC2 after the rail V3 is active. This further sequencing information is added by the designer selecting the respective boxes of the grid in the panel 41 as described above, with the computer entering the respective ticks in the selected boxes, hatching other boxes which consequently can no longer be selected, and horizontally shifting elements of the graphical panel 40 (in this case only the icons for the converters PC3 and PC2) and adding corresponding sequencing arrows 52 and 53, as shown in FIG. 10.

Although as described above the sequencing information is added by selecting check boxes in the grid displayed in the upper panel 41, it can be appreciated that such information can alternatively be provided in any other desired manner, for example by selecting and dragging icons in the graphical panel 40. Changes to the sequencing information can similarly be entered by a designer in similar manners. In each case the computer maintains synchronism between the information displayed in the grid of the panel 41 and in the graphical panel 40, and prevents any attempt to sequence the converters in a way which would result in an inoperable power system.

Thus it can be appreciated that, using the Topology and Sequence displays as described above, even an inexperienced person can very quickly design a desired, possibly complex, power system topology and its sequencing in an intuitive manner and without introducing errors which would detract from or prevent proper operation of a resulting power system.

The Sequence display as described above provides for a startup sequence for the power converters. A normal shut-down sequence is typically the reverse of the startup sequence, so that configuration information for this is easily determined by the computer, as described further below by way of example. In addition, configuration information for shut-down sequencing in a fault situation can also be determined by the computer, which accordingly can generate all of the configuration information for a fully functional power system from the design information provided as described above. As indicated above, any of this configuration information can be modified by a designer selecting, for example, the Advanced tab.

Figure 11:
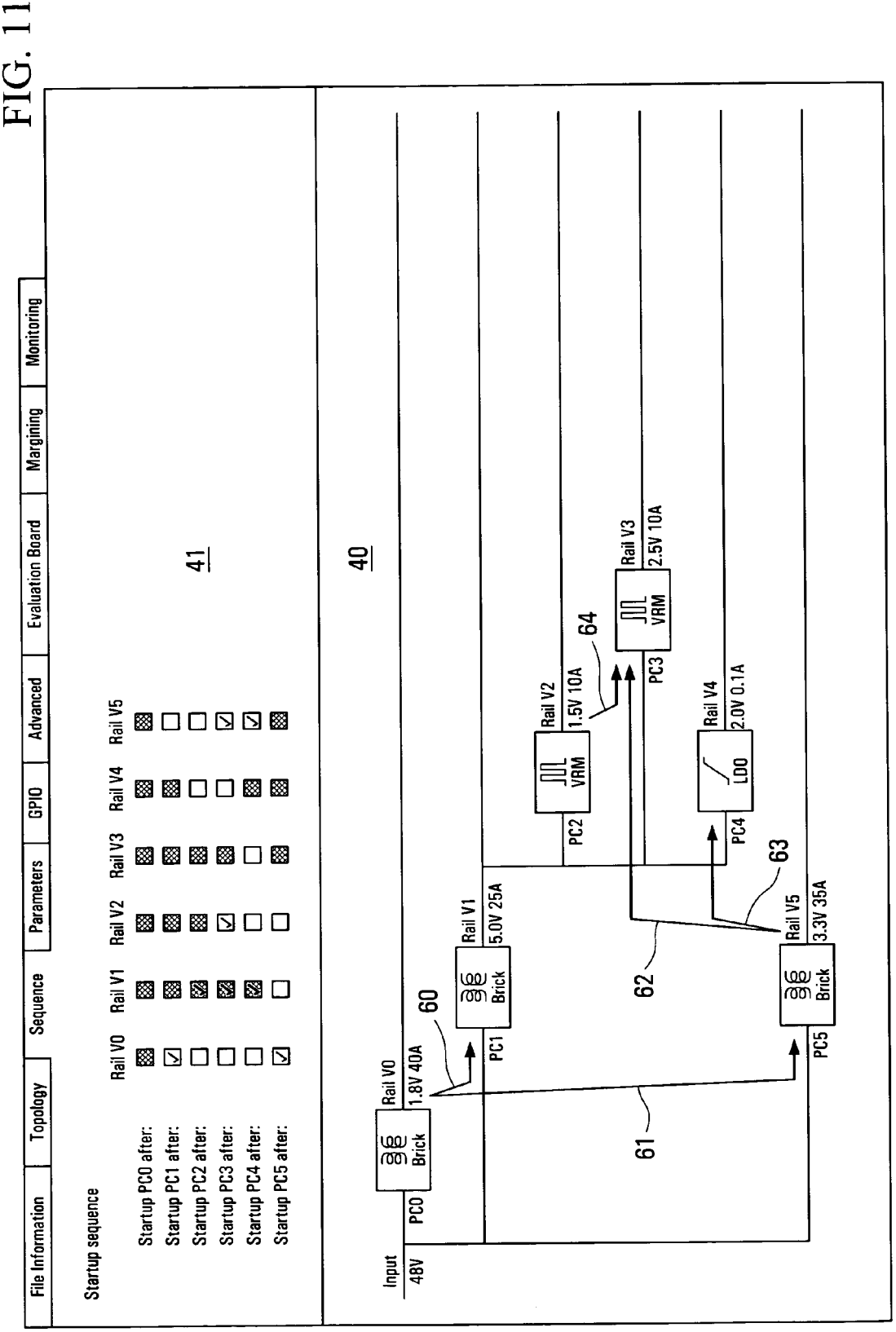
FIG. 11 illustrates the graphical interface, showing a different sequencing of the controlled power supplies of the power supply system having the topology shown in FIGS. 1 and 6.

The power converter startup sequence illustrated in FIG. 10 is a linear sequence, in that the converters are enabled one after another in the order PC0, PC1, PC4, PC5, PC3, and PC2. The power system topology and the graphical interface are not limited to linear sequences, but can also accommodate diverging and converging sequences. An example of startup sequencing using both diverging and converging sequences is illustrated in FIG. 11. It will be appreciated that as shown in FIG. 11 the topology of the power system is the same as that shown FIG. 1 and in FIGS. 6 to 10, but the sequencing is different from that described above.

Referring to FIG. 11, the Sequence display is again illustrated in the same manner as in FIGS. 7 to 10. As shown in the graphical panel 40 by arrows 60 and 61 and a horizontal displacement of the power converters PC1 and PC5 to the right relative to their positions in FIG. 6, each of these converters PC1 and PC5 is enabled or started up after the output voltage rail V0 of the converter PC0 is active. In the grid of the upper panel 41, this is represented by two ticks in the boxes of the V0 column, for the rows for PC1 and PC5 respectively. This represents a diverging sequence, i.e. a sequence in which two or more converters are enabled in response to power-up of a preceding converter in the sequence.

Similarly, a diverging sequence is shown in FIG. 11 for the rail V5 at the output of the converter PC5, by arrows 62 and 63 from this rail to the converters PC3 and PC4 respectively. In the grid in the panel 41, this diverging sequence is represented by two ticks in the V5 column, for the rows for PC3 and PC4 respectively.

As also shown in FIG. 11 by an arrow 64 from the rail V2 to the converter PC3, and a relative horizontal displacement of the icon for the converter to the right, this converter PC3 is enabled in the startup sequence only when both of the rails V2 and V5 are active. This represents a converging sequence, and is also represented in the grid in the panel 41 by two ticks in (unhatched, selectable) boxes of the row for startup of this converter PC3, in the columns for the rails V2 and V5 respectively.

From FIGS. 10 and 11 and the above description it can be appreciated that not only does the graphical panel 40 provide a clear graphical illustration of the startup sequence, but this is also represented fully in the grid of the panel 41, in the unhatched, selectable boxes of which a single tick in a row and column represents a linear sequence, two or more ticks in a column represent a diverging sequence, and two or more ticks in a row represent a converging sequence.

It can be appreciated that, as the graphical Sequence display in each of FIGS. 7 to 11 also illustrates the topology of the power system as developed using the graphical Topology display of FIGS. 3 to 6, it is alternatively possible to merge the functions of the Topology display into those of the Sequence display and to use the resulting combined display instead of these two separate displays. Such a combined display can include the graphical panel 40 (and hence also the graphical panel 30), as well as one or more other panels containing for example the information of the panels 31, 32, and 41 as described above. The functions of defining the topology and sequencing of the power converters in a power system can combined and/or partitioned in these and various other different ways in accordance with different embodiments of the invention.

Figures 12, 13:
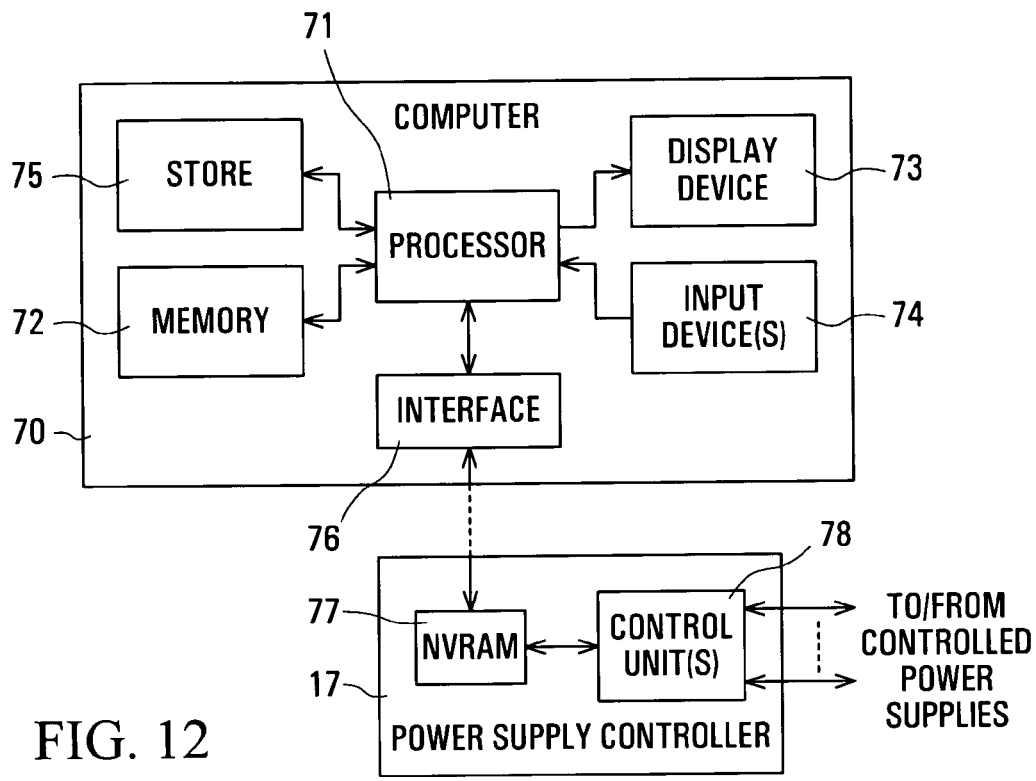
FIG. 12 illustrates a block diagram of a computer, providing the graphical interface, and an associated power supply controller.
FIG. 13 illustrates configuration information for the power supply controller corresponding to the sequencing of controlled power supplies as shown in FIG. 10.

FIG. 12 illustrates a block diagram of a general purpose computer 70, and a power supply controller 17 for controlling and monitoring output voltages of controlled power supplies or converters as described above. The computer 70 includes a processor 71 and associated memory 72 and, coupled to the processor 71, a display device 73 which provides the displays as described above, one or more input devices 74 as also described above, a store 75 for storing information including the database referred to above, and an interface 76 via which information can be exchanged between the computer 70 and the controller 17.

In addition, FIG. 12 shows the NVRAM 77 and control unit(s) 78 of the controller 17, the control unit(s) 78 including the state machines (six converter state machines and one input state machine) referred to above. Information is exchanged between the computer interface 76 and the NVRAM 17 via a path which is shown dashed in FIG. 12 to indicate that this need not be present except during such information exchange. Because the NVRAM 77 provides non-volatile storage, configuration information stored in it is retained in the absence of any power supply to the controller 17, for example when a circuit card on which the controller 17 and the controlled power supplies are provided is removed from equipment so that the input voltage is absent. On power-up of the controller 17, the stored configuration information from the NVRAM 77 is copied into shadow registers of the control unit(s) 78 for operation of the controller 17, as described in the related applications.

Conveniently, the configuration information is mapped in the NVRAM 77 in a manner which matches a mapping of the shadow registers in the control unit(s) 78, so that this copying of configuration information can be carried out easily and quickly. Similarly, the computer 70 can conveniently map this configuration information in a similar manner in its memory 72 (and/or in the store 75), during the steps of defining the topology of the power system and the sequencing of the controlled power supplies as described above, so that it can easily be transferred to the NVRAM 77. As indicated above, during a power system design process the power supply controller 17 and the controlled power supplies or converters can be provided on an evaluation board, and this transfer of configuration information from the memory 72 of the computer 70 to the NVRAM 77 of the controller 17 can be initiated from the computer after selection of the Evaluation Board tab of the display.

As described above, most of the configuration information comprises voltages and time periods associated with each of the controlled power supplies or converters. It can be appreciated that, on the addition of each converter to the power system topology as described above, it is a simple matter for the computer 70 to read this information from the database in the store 75 and to place it in the appropriate positions in the memory 72 (and/or the store 75) for subsequent transfer to the controller 17. For example, each voltage or time period of the configuration information can be mapped to a respective 8-bit byte in the memory 72.

For sequencing the controlled power supplies or converters as described above, the configuration information includes further bytes examples of which are illustrated in FIG. 13. More particularly, these bytes comprise one byte for each of the controlled power supplies for each of the startup, normal shutdown, and fault shutdown sequences. FIG. 13 illustrates the startup bytes STRTEN(n), where n=0 to 5 identifies the respective converters PC0 to PC5, for the startup sequence shown in FIG. 10, and the normal shutdown bytes SHDNEN (n) for the reverse sequence; fault shutdown sequence bytes are not shown in FIG. 13 but are similarly provided. FIG. 13 also shows a byte CONFIG which identifies the presence of the converters PC0 to PC5.

In each of the bytes shown in FIG. 13, a logic 1 in bit positions 0 to 5 identifies the converter state machine (CSM) for a respective one of the converters PC0 to PC5, and bit 7 is always a logic 0. Bit 6 in the byte CONFIG is also 0, and in the other bytes bit position 6 identifies the input state machine (ISM).

It can be seen that the startup sequence PC0, PC1, PC4, PC5, PC3, PC2 illustrated by way of example in FIG. 10 is represented in the STRTEN(n) bytes of FIG. 13 by a logic 1 in bit 6 of STRTEN(0) indicating that the converter PC0 is enabled in response to the input voltage monitored by the ISM, in bit 0 of STRTEN(1) identifying that the converter PC1 is enabled in response to the output voltage V0 of the converter PC0, and similarly in bit 1 of STRTEN(4), bit 4 of STRTEN(5), bit 5 of STRTEN(3), and bit 3 of STRTEN(2). For a converging sequence, the corresponding STRTEN(n) byte would have more than one logic 1 bit for which an AND function is implied. For example, for the converter PC3 in the sequence illustrated in FIG. 11, each of bits 2 and 5 of the byte STRTEN(3) would be a logic 1.

Conversely, the reverse sequence for normal shutdown, i.e. the shutdown sequence PC2, PC3, PC5, PC4, PC1, PC0 for the startup sequence illustrated in FIG. 10, is represented in the SHDNEN(n) bytes of FIG. 13 by a logic 1 in bit 6 of STRTEN(2) indicating that the converter PC2 is disabled in response to the input voltage monitored by the ISM falling below a shutdown voltage threshold, in bit 2 of SHDNEN(3) identifying that the converter PC3 is disabled in response to the output voltage V2 of the converter PC2 falling below a shutdown threshold, and similarly in bit 3 of SHDNEN(5), bit 5 of SHDNEN(4), bit 4 of SHDNEN(1), and bit 1 of SHDNEN(0). For a diverging startup sequence, and hence a converging shutdown sequence, the corresponding SHDNEN(n) byte would have more than one logic 1 bit for which an AND function is implied. For example, for the converter PC5 in the startup sequence illustrated in FIG. 11, each of bits 3 and 4 of the byte SHDNEN(5) would be a logic 1.

Also as illustrated in FIG. 13, a logic 1 in each of bits 0 to 5 of the byte CONFIG represents that each of the converters PC0 to PC5 is present in the power system topology; the absence of any of the converters from the power system is represented by a logic 0 in the corresponding bit of this byte. Further bytes can be provided for similarly identifying the presence of one or more of the converters on respective daughter boards, as described in the related application Ser. No. 10/428,136.

From the above description of the manner in which the bytes illustrated in FIG. 13 correspond to the power system topology and sequencing as also described above, it can be appreciated that the computer 70 can easily set up these bytes in their mapped locations in the memory 72 as the power system topology and converter sequencing are determined by the designer, with these bytes also being transferred to the NVRAM 77 and subsequently to the shadow registers in the control unit(s) 78 of the controller 17 as described above.

Although details of a specific embodiment of the invention are described above, these are given only by way of example and numerous changes can be made. In addition to the possible changes mentioned above, some of these changes include the following.

Although in FIGS. 7 to 11 the sequencing of the power supplies or converters is represented graphically by both the horizontal positioning of the converters and arrows such as the arrows 51 to 53 and 60 to 64, either the horizontal positioning or the arrows may instead be used alone, and each of these can be replaced by any other desired way of representing the sequencing. For example, the sequencing may be represented by vertical instead of horizontal positioning, and/or by numbering the converters in the determined sequence instead of, or in addition to, illustrating the sequence by arrows. Illustrating the sequencing may, if desired, involve a rearrangement of the illustration of the topology of the power system.

As indicated above, other ways, such as drag-and-drop editing, may be used instead or as well as those described above for providing topology and/or sequencing information to the computer, and this may result in modifications of the respective displays. For example, sequencing information may be provided by selecting displayed icons in turn in a desired sequence, and/or by dragging icons in accordance with desired sequence positions. In such cases the grid 41 in the Sequence display may be dispensed with or provided in a separate display, and if displayed is maintained in synchronism with the illustration in the graphical panel 40 by the computer as discussed above.

By way of further example, in the Topology display, instead of first selecting power supplies or converters from the database, icons representing the power converters can be dragged and dropped in their desired positions on the respective voltage lines. In response to the placement of each such icon, the computer can open a window on the display to request information on desired characteristics of the respective power converter, and can then perform a look-up in the database to locate power converters in accordance with these characteristics for selection by the designer. Accordingly, the upper panel 31 of the Topology display can be omitted or provided elsewhere, and similarly the lower panel 32 can be omitted from this display. As already noted, the functions of the Topology and Sequence displays can be combined in a single display.

In addition, although the embodiment of the invention described above relates to a particular type of power supply controller and to particular types of controlled power supplies or converters, these are given only by way of example and the invention is also applicable to other types of controller and controlled devices. For example, instead of there being a single power supply controller 17 as described above, the functions of this may be distributed among two or more control devices, for controlling larger numbers of power converters and/or for convenience, and one or more such controllers can be incorporated into the controlled power supply units themselves.

Instead of using a general purpose computer 70 as described above, it can be appreciated that displays such as those described above can alternatively be provided by dedicated hardware providing similar or equivalent functions. It will also be appreciated that the invention also extends to the computer or other hardware programmed or controlled to operate in a manner to provide the displays as described above, to the software or firmware for providing such programming or control, and to a computer-readable medium storing instructions which, when executed, provide such programming or control.

Thus although particular embodiments of the invention and examples have been described above in detail, it can be appreciated that numerous modifications, variations, and adaptations may be made without departing from the scope of the invention as defined in the claims.

The invention claimed is:

1. A graphical interface method for producing configuration information for control apparatus for a power system including a plurality of power supplies, comprising the steps of, using a processor:
   receiving information relating to characteristics and connections of the plurality of power supplies, said information determining a topology of the power system;
   displaying on a display device a graphical display representing the topology of the power system;
   receiving user input information to determine sequencing of startup or shutdown of the plurality of power supplies during operation of the power system;
   displaying on the display device a graphical display representing the sequencing of the plurality of power supplies; and
   producing said configuration information for the control apparatus consistent with the displayed topology and sequencing of the plurality of power supplies, the control apparatus controlling the plurality of power supplies in accordance with the produced configuration information.

2. A method as claimed in claim 1 wherein the step of receiving said information determining a topology of the power system comprises receiving user input information for identifying information for at least one of the plurality of power supplies in a database.

3. A method as claimed in claim 2 wherein the step of producing said configuration information comprises deriving information for said at least one of the plurality of power supplies from the database.

4. A method as claimed in claim 1 wherein the step of displaying a graphical display representing the topology of the power system comprises displaying icons representing the plurality of power supplies and pats extending to and from the icons representing input and output voltage lines of the power supplies.

5. A method as claimed in claim 4 wherein the step of displaying a graphical display representing the sequencing of the plurality of power supplies comprises displaying at least some of said icons representing the plurality of power supplies in relatively different positions along respective ones of said paths.

6. A method as claimed in claim 5 wherein the step of displaying a graphical display representing the sequencing of the plurality of power supplies further comprises displaying at least one additional symbol representing said sequencing.

7. A method as claimed in claim 6 wherein said at least one additional symbol comprises an arrow representing said sequencing.

8. A method as claimed in claim 1 wherein the step of displaying a graphical display representing the sequencing of the power system comprises displaying icons representing the plurality of power supplies and displaying at least one additional symbol representing said sequencing.

9. A method as claimed in claim 8 wherein said at least one additional symbol comprises at least one arrow representing said sequencing.

10. A method as claimed in claim 8 wherein said at least one additional symbol comprises at least one sequence number representing said sequencing.

11. A method as claimed in claim 8 wherein the step of displaying a graphical display representing the sequencing of the power system further comprises displaying paths extending to and from the icons representing input and output voltage lines of the power supplies.

12. A method as claimed in claim 1 wherein the step of receiving user input information to determine sequencing of the plurality of power supplies comprises the steps of displaying options for possible sequencing of each of the plurality of power supplies after another of the plurality of power supplies, and determining sequencing in response to user input selection of said options.

13. A method as claimed in claim 12 wherein the step of displaying options for possible sequencing of each of the plurality of power supplies after another of the plurality of power supplies comprises displaying a matrix having different representations for selected, selectable, and non-selectable sequencing options.

14. A method as claimed in claim 1 wherein the graphical display representing the sequencing of the plurality of power supplies represents startup sequencing of the power supplies, and the step of producing said configuration information for the control apparatus comprises producing said configuration information for startup sequencing of the power supplies consistent with the displayed sequencing and for normal shutdown of the power supplies with sequencing reversed from the startup sequencing.

15. A method as claimed in claim 1 wherein the steps of displaying comprise representing different types of power supply by different icons.

16. A computer readable storage medium having software stored thereon for instructing a processor to implement the method of claim 1.

17. A method of configuring control apparatus for a power system including a plurality of power supplies, comprising the steps of producing configuration information for the control apparatus using the method of claim 1, and transferring the configuration information to the control apparatus.

18. A graphical interface method for producing configuration information for control apparatus for a power system including a plurality of power supplies, comprising the steps of, using a processor:
   in response to user input, displaying on a display device a graphical display representing the topology and sequencing of startup or shutdown of the plurality of power supplies of the power system during operation of the power system; and
   producing said configuration information for the control apparatus consistent with the displayed topology and sequencing of the plurality of power supplies, the control apparatus controlling the plurality of power supplies in accordance with the produced configuration information.

19. A graphical interface method for producing configuration information for control apparatus for a power system including a plurality of power supplies, comprising the steps of, using a processor:
   in response to user input, selecting power supplies using a database;

in response to user input, determining sequencing of startup or shutdown of the selected power supplies during operation of the power system;

displaying on a display device a graphical display representing the selected power supplies and their sequencing; and producing said configuration information for the control apparatus consistent with the displayed sequencing of the selected power supplies and using information from the database for the selected power supplies, the control apparatus controlling the selected power supplies in accordance with the produced configuration information.

20. A method as claimed in claim 19 wherein the step of displaying a graphical display representing the selected power supplies and their sequencing comprises displaying icons representing the selected power supplies and displaying paths extending to and from the icons representing input and output voltage lines of the selected power supplies.

21. A method as claimed in claim 20 wherein the step of displaying icons comprises representing different types of power supply by different icons.

22. A method as claimed in claim 20 wherein the step of displaying further comprises displaying at least some of said icons representing the selected power supplies in relatively different positions along respective ones of said paths to represent the sequencing of the selected power supplies.

23. A method as claimed in claim 22 wherein the step of displaying further comprises displaying at least one additional symbol representing the sequencing of the selected power supplies.

24. A method as claimed in claim 20 wherein the step of displaying further comprises displaying one or more arrows representing the sequencing of the selected power supplies.

25. A computer readable storage medium having software stored thereon for instructing a processor to implement the method of claim 19.

* * * * *

UNITED STATES PATENT AND TRADEMARK OFFICE
CERTIFICATE OF CORRECTION

| | | |
|---|---|---|
| PATENT NO. | : 7,458,028 B2 | Page 1 of 1 |
| APPLICATION NO. | : 10/621414 | |
| DATED | : November 25, 2008 | |
| INVENTOR(S) | : Avinash Chidambaram et al. | |

It is certified that error appears in the above-identified patent and that said Letters Patent is hereby corrected as shown below:

Claim 4, column 15, line 47, "…pats…" should be --…paths…--.

Signed and Sealed this

Seventeenth Day of March, 2009

JOHN DOLL
*Acting Director of the United States Patent and Trademark Office*